US012663333B2

(12) United States Patent
Zeng et al.

(10) Patent No.: US 12,663,333 B2
(45) Date of Patent: Jun. 23, 2026

(54) METHOD AND APPARATUS FOR GAS LEAK DETECTION

(71) Applicant: ABB Schweiz AG, Baden (CN)

(72) Inventors: Lusha Zeng, Fujian (CN); Juan Wen, Beijing (CN); Guoming Chuai, Fujian (CN); Wei Zheng, Fujian (CN); Yanguo Chen, Fujian (CN)

(73) Assignee: ABBSCHWEIZ AG, Baden (CH)

( * ) Notice: Subject to any disclaimer, the term of this patent is extended or adjusted under 35 U.S.C. 154(b) by 192 days.

(21) Appl. No.: 18/565,991

(22) PCT Filed: Sep. 24, 2021

(86) PCT No.: PCT/CN2021/120482
§ 371 (c)(1),
(2) Date: Nov. 30, 2023

(87) PCT Pub. No.: WO2023/044819
PCT Pub. Date: Mar. 30, 2023

(65) Prior Publication Data
US 2024/0272035 A1 Aug. 15, 2024

(51) Int. Cl.
*G01M 3/32* (2006.01)
*H02B 13/065* (2006.01)
(52) U.S. Cl.
CPC ........ *G01M 3/3272* (2013.01); *H02B 13/065* (2013.01)
(58) Field of Classification Search
CPC ............ G01M 3/00; G01M 3/16; G01M 3/26; G01M 3/32; G01M 3/3272; H02B 13/00; H02B 13/035–065
See application file for complete search history.

(56) References Cited

U.S. PATENT DOCUMENTS

| | | | | |
|---|---|---|---|---|
| 10,190,935 | B2 * | 1/2019 | Inami | ................... G01M 3/3263 |
| 2007/0027640 | A1 | 2/2007 | Rhodes et al. | |
| 2011/0153232 | A1 | 6/2011 | Ito | |

FOREIGN PATENT DOCUMENTS

| | | |
|---|---|---|
| CN | 1199857 A | 11/1998 |
| CN | 102104236 A | 6/2011 |
| CN | 106764456 A | 5/2017 |
| CN | 111090024 A | 5/2020 |
| CN | 113324711 A | 8/2021 |
| EP | 1643230 B1 | 4/2010 |

(Continued)

OTHER PUBLICATIONS

Machine Translation of JP-2012159179-A (Year: 2012).*

(Continued)

*Primary Examiner* — Nguyen Q. Ha
(74) *Attorney, Agent, or Firm* — Greenberg Traurig, LLP

(57) ABSTRACT

Methods, apparatuses, systems, computer readable media, and a computer product for detecting a gas leak of a gas tank. In a method, at least one inside temperature is estimated for the gas tank based on a plurality of outside temperatures that are collected outside the gas tank, the at least one inside temperature being estimated for at least one inside position within the gas tank during an operation of the gas tank. A gas pressure within the gas tank under a standard temperature is obtained based on the at least one inside temperature. The gas leak of the gas tank is detected based on the gas pressure.

15 Claims, 6 Drawing Sheets

(56)                    References Cited

FOREIGN PATENT DOCUMENTS

| JP | H01129702 | A |   | 5/1989  |            |            |
|----|-----------|---|---|---------|------------|------------|
| JP | H03222613 | A |   | 10/1991 |            |            |
| JP | H0862082  | A |   | 3/1996  |            |            |
| JP | H0965528  | A | * | 3/1997  | ........... | H02B 13/065 |
| JP | H1151796  | A |   | 2/1999  |            |            |
| JP | 2012159179 | A | * | 8/2012 | ............. | F17C 13/12 |

OTHER PUBLICATIONS

Machine Translation of JP-H0965528-A (Year: 1997).*
International Search Report and Written Opinion from correspond-
ing International PCT application No. PCT/CN2021/120482, mailed
Jul. 5, 2022.

* cited by examiner

100

110

122

130

120

200

110

212

210

220

300

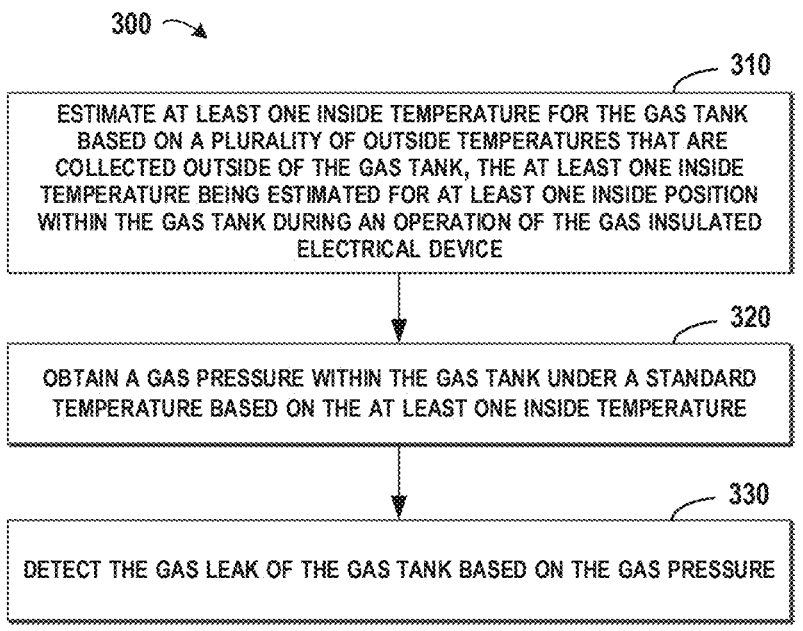

310

ESTIMATE AT LEAST ONE INSIDE TEMPERATURE FOR THE GAS TANK BASED ON A PLURALITY OF OUTSIDE TEMPERATURES THAT ARE COLLECTED OUTSIDE OF THE GAS TANK, THE AT LEAST ONE INSIDE TEMPERATURE BEING ESTIMATED FOR AT LEAST ONE INSIDE POSITION WITHIN THE GAS TANK DURING AN OPERATION OF THE GAS INSULATED ELECTRICAL DEVICE

320

OBTAIN A GAS PRESSURE WITHIN THE GAS TANK UNDER A STANDARD TEMPERATURE BASED ON THE AT LEAST ONE INSIDE TEMPERATURE

330

DETECT THE GAS LEAK OF THE GAS TANK BASED ON THE GAS PRESSURE

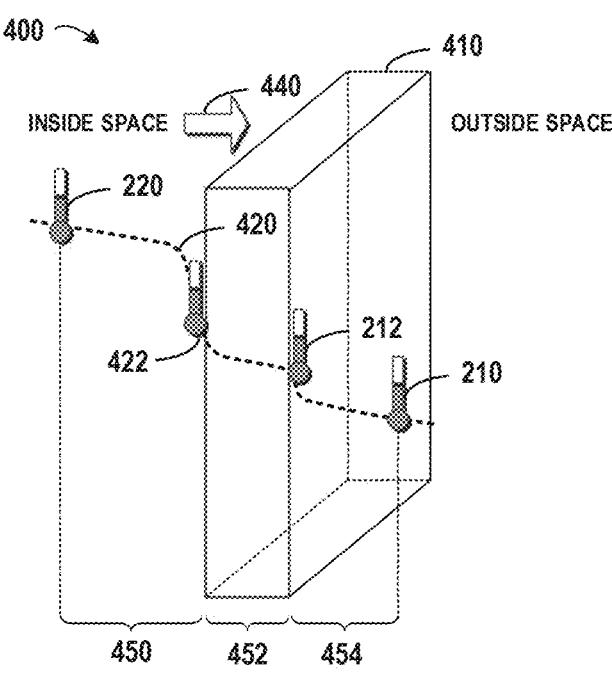

410

440

INSIDE SPACE          OUTSIDE SPACE

| DETERMINING UNIT | OBTAINING UNIT | DETECTING UNIT |

1000

METHOD AND APPARATUS FOR GAS LEAK DETECTION

CROSS-REFERENCE TO RELATED APPLICATIONS

This is a national stage application claiming priority to international patent application Serial No.: PCT/CN2021/120482, filed on Sep. 24, 2021; which is herein incorporated by reference in its entirety.

FIELD

Example embodiments of the present disclosure generally relate to gas leak detection, and more specifically, to methods, apparatuses, systems, computer readable media, and computer products for detecting gas leakage in a Gas Insulated Electrical Device, for example, a GAS Insulated Switchgear (GIS) system, such that the gas tank as well as the GIS system may work in a more safe and effective way.

BACKGROUND

The GIS system refers to an electrical system that houses electrical components in one or more sealed gas tanks filled with insulating gas (such as the sulfur hexafluoride, abbreviated as SF6) and the like. GIS systems are widely used in industry fields, for example, the GIS systems may be deployed in a power supply system to control, protect and isolate electrical components thereby enhancing the reliability of power supply. However, as time elapses, the gas tightness of the tank usually deteriorates due to erosion and/or other reasons such as external damages and the like, which leads to a gas leak of the gas tank. When the gas pressure of the gas tank drops down to a certain level, components in the gas tank may loss protections from the insulating gas, and then potential risks may greatly increase in the GIS system. Therefore, it is desired to propose an accurate and effective way for detecting the gas leak in the GIS system.

SUMMARY

Example embodiments of the present disclosure provide solutions for detecting a gas leak of a gas tank.

In a first aspect of the present disclosure, example embodiments of the present disclosure provide a method for detecting a gas leak of a gas tank of a Gas Insulated Electrical Device. The method comprises: determining at least one inside temperature for the gas tank based on a plurality of outside temperatures that are collected outside of the gas tank, the at least one inside temperature being estimated for at least one inside position within the gas tank during an operation of the Gas Insulated Electrical Device; obtaining a gas pressure within the gas tank under a standard temperature based on the at least one inside temperature; and detecting the gas leak of the gas tank based on the gas pressure. Compared with conventional solutions for detecting the gas leak based on monitoring outside temperatures of the gas tank, these embodiments may provide an estimation of the inside temperature of the gas tank. Usually, the inside temperature may be significantly different from the outside temperature during the operations of the gas tank, the estimation may be more inconsistent with the real inside temperature. As the gas pressure may vary according to the inside temperature of the gas tank, the gas pressure may be determined based on a more reliable ground and thus the gas leak may be detected in an effective and accurate way.

In some embodiments of the present disclosure, the plurality of outside temperatures comprise a first outside temperature and a second outside temperature, the first outside temperature being collected at a first outside position near an outside surface of the gas tank, and the second outside temperature being collected at a second outside position on the outside surface. With these embodiments, the outside temperatures that are collected at different positions outside the gas tank may provide a heat conduction direction, and then based on the heat conduction direction, the inside temperature may be determined in a more accurate way.

In some embodiments of the present disclosure, the at least one inside temperature includes a first inside temperature, which indicates a temperature for a first inside position on an inside surface of the gas tank, and the first inside temperature is determined by: determining an outside heat flux between the first outside position and the second outside position based on the first and second outside temperatures; determining a surface heat flux, that is associated with the first inside temperature, between the second outside position and the first inside outside position; and calculating the first inside temperature based on the outside heat flux and the surface heat flux. With these embodiments, as heat conduction parameters related to a wall of the gas tank may be easily obtained, the first inside temperature on the inside surface may be determined based on the heat conduction direction and the heat conduction parameters easily and effectively. Compared with the conventional solutions for detecting the gas pressure based on the outside temperature of the gas tank, these embodiments may determine the gas pressure in a more accurate way, in turns, the gas leak may be detected based on the accurate gas pressure.

In some embodiments of the present disclosure, the outside heat flux is determined by $\varnothing_{outside}=F(A, h_1, t_{f1}, t_{w1})$, the surface heat flux is determined by $\varnothing_{surface}=G(A, \lambda, \delta, t_{w2}, t_{w1})$, and the first inside temperature is calculated by $t_{w2}=H(h_1, t_{f1}, t_{w1}, \lambda, \delta)$, wherein A represents an area of a wall of the gas tank, $t_{f1}$ represents the first outside temperature, $t_{w1}$ represents the second outside temperature, $t_{w2}$ represents the first inside temperature, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, and F, G and H represent respective mathematical functions. With these embodiments, the technical problem for determining the first inside temperature may be converted into a mathematics problem, and thus the first inside temperature may be calculated accurately according to an equation solving method. Therefore, the first inside temperature may provide an accurate ground for detecting the gas leak.

In some embodiments of the present disclosure, the at least one inside temperature further includes a second inside temperature, which indicates a temperature for a second inside position near the inside surface, and the second inside temperature is determined by: determining an inside heat flux between the first inside position and the second inside position; and calculating the second inside temperature based on the surface heat flux and the inside heat flux. The inside temperatures for various positions in the gas tank are not always the same during operations of the gas tank, and usually the temperature for a central position of the gas tank may reflect the average temperature of the gas tank. With these embodiments, the second inside temperature may be estimated for a position much closer to a center of the gas tank, which may be accurate than the first inside temperature for further processing. Therefore, the gas pressure may be determined in a more accurate way, so as to provide a reliable ground for detecting the gas leak.

In some embodiments of the present disclosure, the inside heat flux is determining by $\emptyset_{inside}$=I(A, $h_2$, $t_{w2}$, $t_{f2}$), and the second inside temperature is calculated by $t_{f2}$=S($h_1$, $h_2$, $\lambda$, $\delta$, $t_{f1}$, $t_{w1}$), wherein $t_{f2}$ represents the second inside temperature, $t_{f1}$ represents the first outside temperature, $t_{w1}$ represents the second outside temperature, $t_{w2}$ represents the first inside temperature, A represents an area of a wall of the gas tank, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, $h_2$ represents a coefficient of heat transfer related to $t_{w2}$ and $t_{f2}$, and I and S represent respective mathematical functions. With these embodiments, the technical problem for determining the second inside temperature may be converted into a mathematics problem, and thus the second inside temperature may be calculated accurately according to an equation solving method. Therefore, the second inside temperature may provide an accurate ground for detecting the gas leak.

In some embodiments of the present disclosure, detecting the gas leak comprises detecting the gas leak in response to any of: a determination that the gas pressure is below a threshold pressure; and a determination that a change associated with the gas pressure is above a threshold change. With these embodiments, the gas pressure may be monitored at specific time point and/or in a continuously way. Therefore, multiple ways may be provided for detecting the gas leak easily and effectively.

In some embodiments of the present disclosure, first and second positions are selected based on a planar surface of the gas tank that is larger than another outside surface of the gas tank. Compared with a surface of the gas tank with a complex shape, the heat conduction procedure may be easily defined for a large planar surface, usually a larger planar surface may be selected and the outside temperature maybe collected from a temperature sensor that is placed near or at the selected surface. Therefore, the inside temperature may be calculated based on an accurately defined heat conduction procedure, such that errors related to the gas leak detection may be reduced.

In some embodiments of the present disclosure, the method further comprises: updating the inside temperature based on a current strength of Gas Insulated Electrical Device, the current strength being received from a controller of the Gas Insulated Electrical Device. Usually, the inside temperature varies during operations of the gas tank. Due to the electrical components also provide heat sources, the higher the current strength is, the higher the inside temperature is. Therefore, the current strength may be considered as an environment factor for updating the inside temperature. With these embodiments, the gas pressure may be determined in a more accurate way, such that the gas leak may be detected effectively.

In a second aspect, example embodiments of the present disclosure provide an apparatus for detecting a gas leak of a gas tank of a Gas Insulated Electrical Device. The apparatus comprises: a determining unit, being configured for determining at least one inside temperature for the gas tank based on a plurality of outside temperatures that are collected outside of the gas tank, the at least one inside temperature being estimated for at least one inside position within the gas tank during an operation of the Gas Insulated Electrical Device; an obtaining unit, being configured for obtaining a gas pressure within the gas tank under a standard temperature based on the at least one inside temperature; and a detecting unit, being configured for detecting the gas leak of the gas tank based on the gas pressure.

In some embodiments of the present disclosure, the plurality of outside temperatures comprise a first outside temperature and a second outside temperature, the first outside temperature being collected at a first outside position near an outside surface of the gas tank, and the second outside temperature being collected at a second outside position on the outside surface.

In some embodiments of the present disclosure, the at least one inside temperature includes a first inside temperature, which indicates a temperature for a first inside position on an inside surface of the gas tank, and the determining unit is further configured for: determining an outside heat flux between the first outside position and the second outside position based on the first and second outside temperatures; determining a surface heat flux, that is associated with the first inside temperature, between the second outside position and the first inside outside position; and calculating the first inside temperature based on the outside heat flux and the surface heat flux.

In some embodiments of the present disclosure, the at least one inside temperature further includes a second inside temperature, which indicates a temperature for a second inside position near the inside surface, and the determining unit is further configured for: determining an inside heat flux between the first inside position and the second inside position; and calculating the second inside temperature based on the surface heat flux and the inside heat flux.

In a third aspect, example embodiments of the present disclosure provide a system for detecting a gas leak of a gas tank. The system comprises: a computer processor coupled to a computer-readable memory unit, the memory unit comprising instructions that when executed by the computer processor implements the method according to the first aspect.

In a fourth aspect, example embodiments of the present disclosure provide a computer readable medium having instructions stored thereon, the instructions, when executed on at least one processor, cause the at least one processor to perform the method according to the first aspect.

In a fifth aspect, example embodiments of the present disclosure provide a computer product having instructions stored thereon, the instructions, when executed on at least one processor, cause the at least one processor to perform the method according to the first aspect.

DESCRIPTION OF DRAWINGS

FIG. 3 illustrates a flowchart of a method for detecting a gas leak of a gas tank in accordance with embodiments of the present disclosure;

FIG. 4 illustrates a schematic diagram for a heat conduction procedure between an outside space and an inside space of a gas tank in accordance with embodiments of the present disclosure;

Throughout the drawings, the same or similar reference symbols are used to indicate the same or similar elements.

DETAILED DESCRIPTION OF EMBODIMENTS

Figure 1:
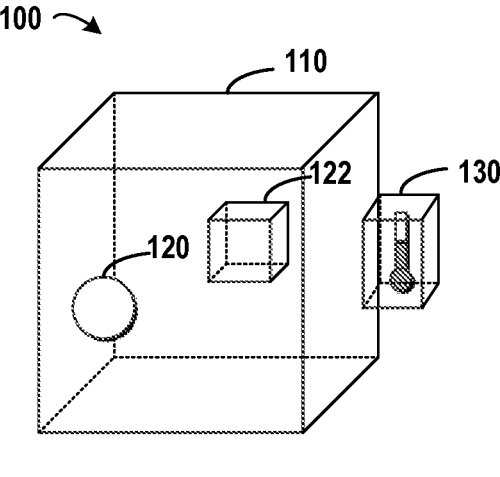
FIG. 1 illustrates a schematic diagram for a gas tank in a GIS system in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of an environment of the present disclosure. FIG. 1 illustrates a schematic diagram 100 for a gas tank in a GIS system in which embodiments of the present disclosure may be implemented. In FIG. 1, the GIS system may include a gas tank 110 and other devices (not illustrated), where one or more electronical components 120, 122, and the like may be deployed within the gas tank 110. The gas tank 110 may be made of metal materials and or other materials, and insulating gas such as SF6 may be filled into the sealed gas tank 110 for protecting the inside electronical components 120 and 122. Here, other types of gas or mixed gas, such as nitrogen or dry air, may be sealed in the gas tank for insulating. However, due to deteriorates and/or other damages may affect the gas tightness of the gas tank 110, whether a gas leak occurs should be detected during operations of the gas tank 110.

As most gas tanks are made of materials that shield wireless signals, further the gas tank 110 does not allow any hole through which a cable may go for transmitting the collected data from the inside to the outside, it is difficult to monitor the gas pressure inside the gas tank 110 in a real time during operations of the gas tank 110. Various solutions are provided for detecting the gas leak, for example, a measuring device 130 may be used to estimate the gas pressure inside the gas tank 110. Here, the measuring device 130 is placed on the outside surface of the gas tank 110 and collects a temperature of the outside surface of the gas tank 110.

As the gas pressure depends on the temperature, the measuring device 130 may estimate the inside gas pressure based on the collected temperature. However, the collected temperature is an outside temperature but not an inside temperature, although the outside temperature may roughly reflect the inside temperature, sometimes non-negligible difference may occur between the inside temperature and the outside temperature. Accordingly, the inside gas pressure that is outputted from the measuring device 130 may involve a great error, and the whether the gas leak occurs cannot be detected accurately.

Figure 2:
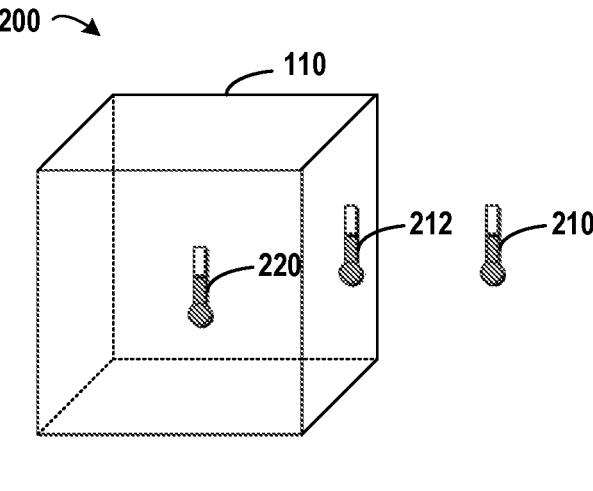
FIG. 2 illustrates a schematic diagram for detecting a gas leak of a gas tank in accordance with embodiments of the present disclosure.

In order to at least partially solve the above and other potential problems, the present disclosure proposes a new method for detecting a gas leak of a gas tank of a Gas Insulated Electrical Device. Reference will be made to FIG. 2 for a general description of the proposed method, where FIG. 2 illustrates a schematic diagram 200 for detecting a gas leak of a gas tank in accordance with embodiments of the present disclosure. In FIG. 2, the gas tank 110 is deployed in a Gas Insulated Electrical Device, a plurality of outside temperatures 210 and 212 may be collected outside the gas tank 110 for determining one or more inside temperatures 220. Here, the inside temperature 220 represents a gas temperature within the gas tank 110. For example, it may represent a temperature at an inside surface of the gas tank 110; alternatively, it may represent a temperature near the inside surface (for example, 2-3 centimeters from the inside surface). Further, the inside temperature 220 may be used for calculating the gas pressure and then determining whether the gas leak occurs in gas tank 110.

Compared with conventional solutions for detecting the gas leak based on an outside temperature that is collected outside the gas tank 110, these embodiments may provide a relative accurate estimation of the inside temperature of the gas tank 110. As the gas pressure may vary according to the inside temperature of the gas tank 110, the gas pressure may be determined based on a more reliable ground and thus the gas leak may be detected in an effective and accurate way.

Although FIGS. 1 and 2 show that the gas tank 110 is in a GIS system, the GIS system is only an example where the gas tank 110 is deployed for the purpose of description. The proposed method may also be implemented for determining a gas leak for another gas tank that is deployed in another system. For example, the gas tank may be used in a natural gas factory for storing natural gas.

Reference will be made to FIG. 3 for more details about the proposed method, where FIG. 3 illustrates a flowchart of a method 300 for detecting a gas leak of a gas tank in accordance with embodiments of the present disclosure. At a block 310 of FIG. 3, at least one inside temperature 220 for the gas tank 110 is estimated based on a plurality of outside temperatures 210 and 212 that are collected outside of the gas tank 110. Here, the at least one inside temperature 220 is estimated for at least one inside position within the gas tank 110 during an operation of the Gas Insulated Electrical Device. Compared with conventional solutions for detecting the gas leak based on an outside temperature, these embodiments may provide an estimation of the inside temperature of the gas tank 110, and then the gas pressure may be determined based on a more reliable ground, such that the gas leak may be detected in an effective and accurate way.

In some embodiments of the present disclosure, the inside temperature 220 may be determined according to a heat conduction procedure associated with the gas tank 110. FIG. 4 illustrates a schematic diagram 400 for a heat conduction procedure between an outside space and an inside space of a gas tank in accordance with embodiments of the present disclosure. Here, the gas tank 110 may include multiple walls that separate the whole space into an outside space and an inside space. FIG. 4 illustrates a wall 410 in the multiple walls, where the left portion represents an inside space of the gas tank 110, and the right portion represents an outside space of the gas tank 110. Here, the heat may transfer between the outside space and the inside space, for example, in a direction from the inside space to the outside space as shown by an arrow 440. Usually, the gas tank 110 in the GIS system is in a cuboid shape, therefore the wall 410 may be selected from any of multiple side walls of the gas tank 110.

Compared with a surface with a complex shape, the heat conduction procedure may be easily defined for a large planar surface of the gas tank 110. Usually a larger planar surface may be selected and the outside temperature maybe collected from a temperature sensor that is placed outside the selected surface. In some embodiments of the present disclosure, in order to select the wall 410, a wall that includes a planar and larger surface may be selected. For example, a wall with the largest planar surface may be selected and the outside temperature may be collected near and on the outside surface of the wall 410. Once the wall 410 is determined, the first and second outside positions may be selected based on the wall 410, for example, the first outside position may be near the outside surface of the wall 410 and the second outside position may be on the outside surface of the wall 410. Therefore, the inside temperature may be calculated based on an accurately defined heat conduction procedure, such that errors related to the gas leak detection may be reduced.

In FIG. 4, the heat may transfer from the left side to the right side, and thus temperatures along the direction 440 may drop. A curve 420 shows changes of the temperatures along the direction 440. In some embodiments of the present disclosure, the plurality of outside temperatures may comprise the first outside temperature 210 that is collected at a first outside position near the outside surface of the gas tank 110. At this point, the first outside position may be located at a distance of 2-3 centimeters (or another value) from the outside surface of the wall 410. As shown in FIG. 4, the first outside temperature 210 corresponds to a point in the curve 420.

Further, the plurality of outside temperatures may comprise a second outside temperature 212 that is collected at a second outside position on the outside surface. Here, the second outside position may be located on the outside surface of the wall 410. As the heat transfers from the left side to the right side, the second outside temperature 212 is higher than the first outside temperature 210. Further, the at least one inside temperature may be determined based on the first and second outside temperatures 210 and 212. With these embodiments, the outside temperatures that are collected at different positions outside the gas tank 110 may provide a heat conduction direction, and based on the heat conduction direction, the inside temperature may be determined in a more accurate way.

As shown in FIG. 4, the outside temperatures 210 and 212 may be collected by one or more temperature sensors that are deployed at corresponding positions, and thus the outside temperatures 210 and 212 on the right side of the wall 410 have known values. Further, the temperatures 422 and 220 that are on the left side of the wall 410 are unknown and should be calculated based on the heat conduction procedure. In FIG. 4, the heat conduction procedure may include multiple phases: an inside conduction phase 450, where the heat transfers from the second inside position near the inside surface of the wall 410 to the first inside position on the inside surface; a surface conduction phase 452, where the heat transfers from the first inside position on the inside surface to a second outside position on the outside surface of the wall 410; and an outside conduction phase 454, where the heat transfers from second outside position on the outside surface of the wall 410 to the first outside position near the outside surface. Based on the heat flux theory, heat flux associated with the above three phases are identical, and details about these multiple phases will be provided, respectively.

In some embodiments of the present disclosure, the at least one inside temperature includes a first inside temperature that is estimated for a first inside position at an inside surface of the gas tank. Specifically, in the outside conduction phase 454, the outside heat flux between the first outside position and the second outside position may be determined based on the first and second outside temperatures. Specifically, the outside heat flux associated with the outside conduction phase 454 may be represented by Formula (1):

$$\emptyset_{outside} = F(A, h_1, t_{f1}, t_{w1}) = Ah_1(t_{f1} - t_{w1}) \qquad \text{Formula (1)}$$

Where $\emptyset_{outside}$ represents a heat flux associated with the outside conduction phase 454, F represents a mathematical function associated with A, $h_1$, $t_{f1}$, and $t_{w1}$, A represents a known area of the wall 410, $h_1$ represents a known coefficient of the heat transfer corresponding to the outside conduction phase 454, $t_{f1}$ represents a known first outside temperature 210 that is collected near the outside surface of the wall 410, $t_{w1}$ represents a known second outside temperature 212 that is collected on the outside surface of the wall 410. In Formula (1), $h_1$ may be determined according to the heat flux theory and thus has a known value. Accordingly, $\emptyset_{outside}$ may be calculated and has a known value.

Regarding the surface conduction phase 452, the surface heat flux between the second outside position and the first inside position may be determined according to Formula (2). Specifically, a surface heat flux associated with the surface conduction phase 452 may be represented by Formula (2):

$$\emptyset_{surface} = G(A, \lambda, \delta, t_{w2}, t_{w1}) = A\frac{\lambda}{\delta}(t_{w1} - t_{w2}) \qquad \text{Formula (2)}$$

Where $\emptyset_{wall}$ represents a surface heat flux associated with the surface conduction phase 452, G represents a mathematical function associated with A, $\lambda$, $\delta$, $t_{w2}$ and $t_{w1}$, A represents the known area of the wall 410, $\lambda$ represents a known coefficient of the heat transfer corresponding to the surface conduction phase 452 (which may be determined based on the material of the wall), $\delta$ represents a known thickness of the wall 410, $t_{w1}$ represents the known second outside temperature 212 that is collected on the outside surface of the wall 410, and $t_{w2}$ represents a first inside temperature 422 on the inside surface of the wall 410. In Formula (2), $t_{w2}$ has an unknown value and may be determined on Formula (1). Further, the first inside temperature may be obtained based on the outside heat flux $\emptyset_{outside}$ and the surface heat flux $\emptyset_{surface}$.

In some embodiments of the present disclosure, in order to determine the surface heat flux, the surface heat flux may be represented based on the second outside temperature and the first inside temperature that has a first unknown value according to Formula (1). Then, a first heat flux equation may be generated based on the outside heat flux and the surface heat flux, so as to determine the first inside temperature by solving the first unknown value from the first heat flux equation. Due to the heat flux theory, Formula (1) and Formula (2) have the same heat flux, and thus Formula (3) may be obtained.

$$\phi_{outside} = \phi_{surface} \qquad \text{Formula (3)}$$

Where $\phi_{outside}$ represents a heat flux associated with the outside conduction phase 454, and $\phi_{wall}$ represents a wall flux associated with the surface conduction phase 452.

Based on the above formula (1)-(3), the first inside temperature $t_{w2}$ may be determined according to Formula (4):

$$t_{w2} = H(h_1, t_{f1}, t_{w1}, \lambda, \delta) = t_{w1} - \frac{h_1(t_{f1} - t_{w1})\delta}{\lambda} \qquad \text{Formula (4)}$$

In Formula (4), all the symbols have the same meanings as those in Formulas (1)-(3), and H represents a mathematical function associated with $h_1$, $t_{f1}$, $t_{w1}$, $\lambda$ and $\delta$, and details are omitted hereinafter. At this point, all the parameters on the right side of Formula (4) have known values and thus $t_{w2}$ may be determined directly. With these embodiments, the first inside temperature may be determined based on the heat conduction direction and heat conduction parameters easily and effectively.

In the above embodiments, the technical problem for determining the first inside temperature may be converted into a mathematics problem, and thus the first inside temperature may be calculated accurately according to an equation solving method. Therefore, the first inside temperature may provide an accurate ground for detecting the gas leak. Although the first inside temperature is not accurate enough for representing the inside temperature, it is much better than the conventional solutions for detecting the gas pressure based on the outside temperature of the gas tank 110. Further, based on a better inside temperature, these embodiments may determine the gas pressure in a more accurate way.

Further, the inside conduction phase 450 may be considered for determining the inside temperature 220 in FIG. 4. In some embodiments of the present disclosure, the at least one inside temperature includes a second inside temperature that is estimated for a second inside position near the inside surface. In order to determine the second inside temperature, an inside heat flux may be generated between the first inside position and the second inside position; and then the second inside temperature may be obtained based on the surface heat flux and the inside heat flux. Specifically, an inside heat flux associated with the inside conduction phase 450 may be represented by Formula (5):

$$\phi_{inside} = I(A, h_2, t_{w2}, t_{f2}) = Ah_2(t_{w2} - t_{f2}) \qquad \text{Formula (5)}$$

Where $\phi_{inside}$ represents a heat flux associated with the inside conduction phase 450, I represents a mathematical function associated with A, $h_2$, $t_{w2}$ and $t_{f2}$, A represents an area of the wall 410, $h_2$ represents a coefficient of the heat transfer corresponding to the inside conduction phase 450, $t_{w2}$ represents a first inside temperature 422 on the inside surface of the wall 410, and $t_{f2}$ represents a second inside temperature (for example, as shown by the inside temperature 220 in FIG. 4) near the inside surface of the wall 410. In Formula (5), $h_2$ may be determined according to the conventional solution such as a regression procedure and thus has a known value.

In some embodiments of the present disclosure, in order to determine the inside heat flux, the inside heat flux may be represented based on the first inside temperature and the second inside temperature that has a second unknown value. Further, a second heat flux equation may be determined based on the surface heat flux and the inside heat flux; and then the second inside temperature may be determined by solving the second unknown value from the second heat flux equation. Details for determining the second inside temperature are similar to those for determining the first inside temperature, and details are simplified hereinafter. Due to the heat flex theory, Formula (3) and Formula (5) have the same heat flex, and thus Formula (6) may be obtained.

$$\phi_{surface} = \phi_{inside} \qquad \text{Formula (6)}$$

Based on the above formula (3)-(6), the second inside temperature $t_{f2}$ may be determined according to Formula (7):

$$t_{f2} = S(h_1, h_2, \lambda, \delta, t_{f1}, t_{w1}) = t_{w2} - \frac{\lambda(t_{w1} - t_{w2})}{\delta h_2} \qquad \text{Formula (7)}$$

In Formula (7), all the symbols have the same meanings as those in Formulas (1)-(6), S represents a mathematical function associated with $h_1$, $h_2$, $\lambda$, $\delta$, $t_{f1}$ and $t_{w1}$. In other words, all the parameters on the right side of Formula (7) have known values and thus $t_{f2}$ may be determined directly. With these embodiments, the technical problem for determining the second inside temperature may be converted into a mathematics problem, and thus the second inside temperature may be calculated accurately according to an equation solving method. Therefore, the second inside temperature may provide an accurate ground for detecting the gas leak.

The inside temperatures at various positions are not always the same during operations of the Gas Insulated Electrical Device, and usually the temperature for a center of the gas tank may reflect the average temperature of the gas tank 110. With these embodiments, the second inside position may be closer to a central position near the inside surface for a further processing. Therefore, the gas pressure may be determined in a more accurate way based on the second inside temperature, so as to provide a reliable ground for detecting the gas leak.

The preceding paragraphs have provided multiple methods for determining the inside temperatures at various inside positions. Further, either of the first and second temperatures may be used for determining the gas pressure. Referring back to FIG. 3, at a block 320, a gas pressure within the gas tank 110 under a standard temperature is obtained based on the at least one inside temperature. It is to be understood that the gas pressure may vary with the temperature, the higher the inside temperature 220 is, the higher the gas pressure is. Therefore, the estimated inside temperature may be used to estimate a gas pressure under the inside temperature 220, and then the estimated gas pressure may be converted into a standard situation for further processing. Specifically, a standard temperature 20° C. may be taken as the standard situation, here the gas pressure under the standard situation is represented as $P_{20}$.

In some embodiments of the present disclosure, the standard gas pressure may be determined based on an association between the mole number of the gas included in the gas tank 110 and the gas temperature (such as the inside temperature). Specifically, the following Formulas (8) and (9) exist:

$$\frac{P}{T_c} = \frac{n}{V}R \qquad \text{Formula (8)}$$

Where P represents the gas pressure under the temperature $T_c$ (Kelvin), n represents the mole number of the gas (which has a known value from the manufacture of the gas tank), V represents a volume of the gas (i.e., a volume of the gas tank), and R represents a gas constant for the specific gas. As $$\frac{n}{V}$$

represents the gas density equivalence, the above Formula (8) may be converted to the following Formula (9):

$$P_{20} = \frac{P}{T_c} * (273 + 20) \qquad \text{Formula (9)}$$

Where $P_{20}$ represents a gas pressure with a certain gas density equivalence under 20° C. (represented as 273+20 K in the Kelvin degree). Therefore, based on the above estimated gas pressure P and the gas temperature $T_c$, the standard gas pressure under 20° C. may be determined from Formula (9). Although the above Formula (9) may be used for determining $P_{20}$ roughly, sometimes this method is not accurate enough. Therefore, the gas pressure law for a specific gas (such as SF6) can be determined experimentally. Here, the second inside temperature $t_{f2}$ may be taken as gas temperature, and the standard gas pressure $P_{20}$ may be determined the following experimental Formulas (10), (11) and (12):

$$P_{20} = 56.2\gamma T_K(1 + V) - \gamma^2 U \qquad \text{Formula (10)}$$

$$U = 74.9\left(1 - 0,727 * 10^{-3}\gamma\right) \qquad \text{Formulal (11)}$$

$$V = 2.51 * 10^{-3}\gamma\left(1 - 0.846 * 10^{-3}\right) \qquad \text{Formula (12)}$$

Where $P_{20}$ represents the standard gas pressure (in the unit of Pa), $\gamma$ represents the gas density (in the unit of kg/m³, and it may be measured under various temperatures, and $T_K$ represents the inside temperature 220 that is estimated according to the above paragraphs. With these embodiments, as above Formulas (10)-(12) are determined for the specific gas SF6, the standard gas pressure $P_{20}$ may be determined in a more reliable way so as to remove potential errors in detecting the gas leak.

At a block 330, the gas leak of the gas tank 110 is determined based on the gas pressure. Here, if the gas tank 110 is sealed and in a good condition, then the gas pressure $P_{20}$ may remain to an approximate constant value. If the gas tank 110 leaks, then the gas pressure may drop. In some embodiments of the present disclosure, the gas pressure may be monitored at specific time point and/or in a continuously way. For example, the gas leak may be detected when the gas pressure being below a threshold pressure. Alternatively and/or in addition to, the gas leak may be detected when a change associated with the gas pressure being above a threshold change.

In some embodiments of the present disclosure, the gas tank includes a sealed gas tank in a Gas Insulated Switchgear (GIS) system for housing a plurality of electrical components. With these embodiments, the above method may be implemented in a GIS system, such that potential faults caused by a gas leak of the gas tank may be discovered in time and then remedial actions may be taken for removing the faults.

In some embodiments of the present disclosure, a current strength for the plurality of electrical components may be obtained, and then the inside temperature may be updated based on the current strength. Usually, the inside temperature varies during operations of the Gas Insulated Electrical Device. Due to the electrical components also provide heat sources, the higher the current strength is, the higher the inside temperature is. Therefore, the current strength may be considered as an environment factor for updating the inside temperature. With these embodiments, the gas pressure may be determined in a more accurate way, such that the gas leak may be detected effectively.

Hereinafter, a detailed example will be provided for describing how to detect a gas leak in a specific GIS system. Here, the above method 300 may be implemented in a GIS system including one or more gas tanks. Supposing the GIS system has a busbar gas tank and a circuit breaker gas tank, the above method 300 may be implemented individually for the two gas tanks. Reference will be made to the circuit breaker gas tank as an example, and implementations for the busbar gas tank are similar. Initially, a large planner wall (such as the back wall) may be selected from multiple side walls of the circuit breaker gas tank. A temperature sensor may be deployed near an outside surface of the back wall for collecting the outside temperatures $t_{f1}$ and $t_{w1}$ periodically, then the standard gas pressure $P_{20}$ may be determined based on the above Formulas (1)-(11).

The above outside temperatures $t_{f1}$ and $t_{w1}$ may be collected periodically, for example every minute (or at another interval) in a day, and a minimum or an average may be used as the day pressure. A threshold pressure may be predefined for indicating a safe condition. If the day pressure is above the threshold pressure, it indicates that the circuit breaker gas tank is sealed and no gas leak is detected. If the average day pressure is below the threshold pressure, then it indicates that a gas leak is detected and remedial actions should be taken to repair the circuit breaker gas tank. Here, the threshold pressure may be defined in a relative format (such as 98% of the original $P_{20}$ value). Alternatively and/or in addition to, the threshold pressure may be defined in an absolute format (such as 0.01 bar). With these embodiments, the gas pressure may be monitored continuously and thus negative effects of potential errors in determining the gas pressure may be reduced.

Alternatively and/or in addition to, a change between the gas pressures for various time points may be determined, and the gas leak may be detected if the change is above a threshold change. Here, the threshold change may be defined in a relative format such as 1% or another value. In some embodiments, the threshold change may be defined in an absolute format.

Figure 5:
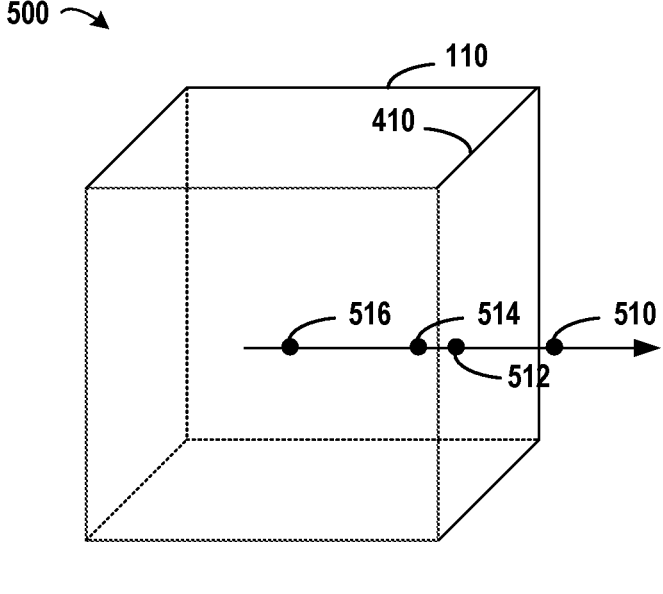
FIG. 5 illustrates a schematic diagram for collecting multiple outside temperatures and multiple inside temperatures associated with a gas tank in accordance with embodiments of the present disclosure.

With these embodiments, as the inside temperature is used for determining the gas pressure, the accuracy of the determined gas pressure may be higher than the gas pressure determined from the outside temperature. Therefore, the gas leak may be detected in an accurate and effective way. Hereinafter, reference will be made to FIG. 5 for a test for proving the accuracy of the proposed method 300. FIG. 5 illustrates a schematic diagram 500 for collecting multiple outside temperatures and multiple inside temperatures associated with a gas tank in accordance with embodiments of the present disclosure. In FIG. 5, a wall 410 may be selected for the test, where temperatures at multiple outside and inside positions may be monitored in the test. As shown in FIG. 5, a position 510 is near the outside surface of the wall 410, a position 512 is on the outside surface of the wall 410, a position 514 is on the inside surface of the wall 410, and a position 516 is near the inside surface of the wall 410. Here, both of the positions 510 and 512 are outside the gas tank 110, and both of the positions 514 and 516 are inside the gas tank 110. Further, the GIS system may be started and then the gas tank 110 enters an operation state.

Figure 6:
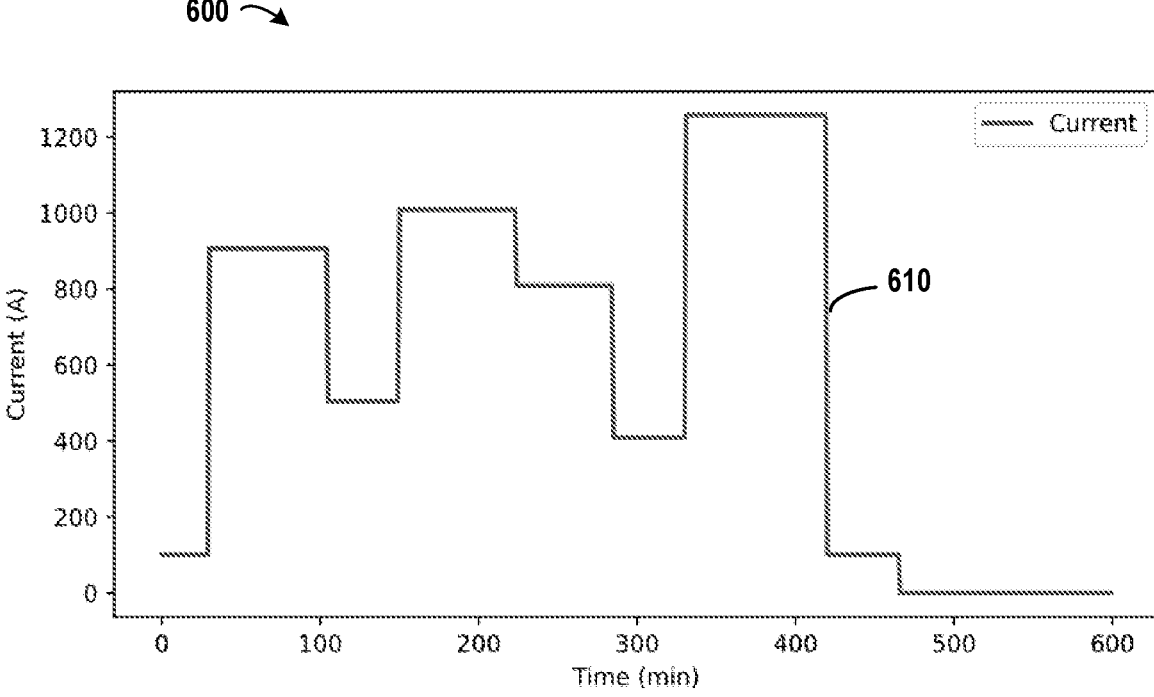
FIG. 6 illustrates a schematic diagram of a current that is measured at an electronical component inside a gas tank in accordance with embodiments of the present disclosure.

Here, electronical components in the gas tank 110 may be driven by currents with various strengths within a predefined range, therefore the test should be implemented under various current strengths so as to ensure a reliable result of the test. FIG. 6 illustrates a schematic diagram 600 of a current that is measured at an electronical component in a gas tank in accordance with embodiments of the present disclosure. In FIG. 6, the horizontal axis represents the time, which shows that the test lasts 600 minutes, the vertical axis represents the current strength, and a curve 610 shows the varied current strength. In this example, the current strengths covers a range of [0, 1250], which depends on the type of the GIS system. The GIS system may be driven according to the current strength illustrated in FIG. 6 and multiple groups of outside and inside temperatures may be collected at the multiple positions 510, 512, 514 and 516 at a predefined interval.

Figure 7A:
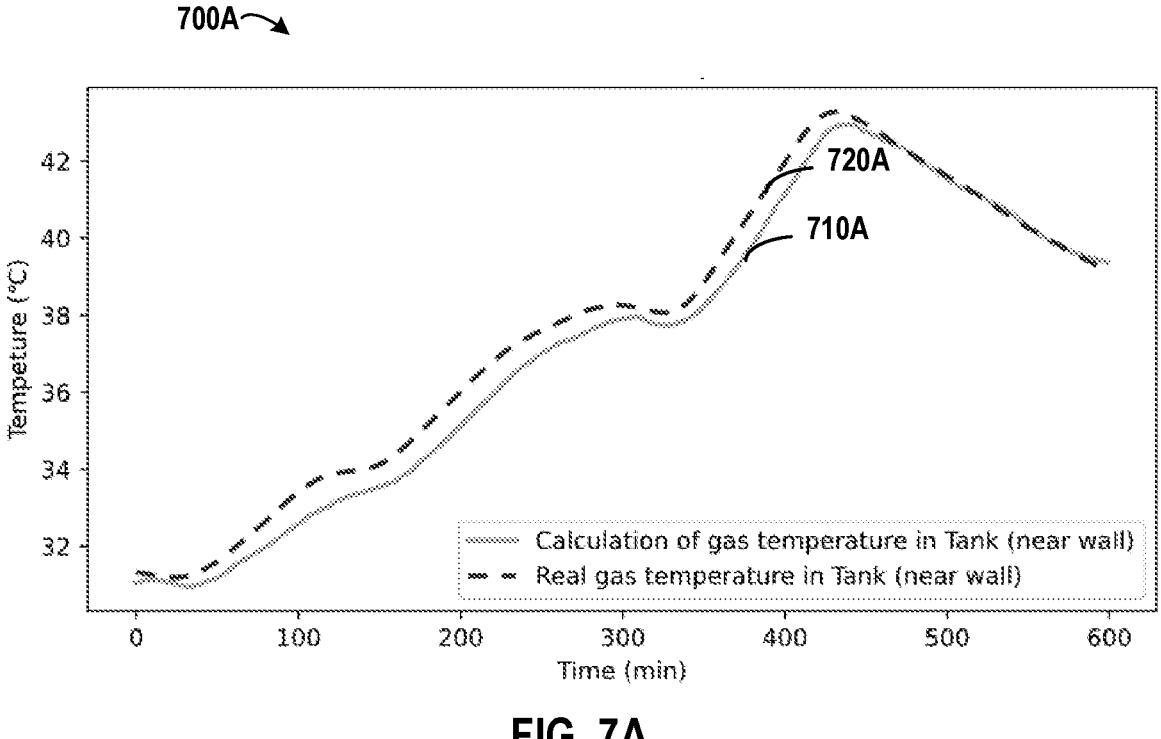
FIG. 7A illustrates a schematic diagram for a comparison between an estimated inside temperature and a real inside temperature in accordance with embodiments of the present disclosure.

Further, the above method 300 may be implemented so as to estimate the inside temperatures at the inside positions 514 and 516 by using the collected outside temperatures. Next, the estimated inside temperatures may be used for determining a gas pressure, and reference will be made to FIGS. 7A and 7B for more information for the circuit breaker gas tank. FIG. 7A illustrates a schematic diagram 700A for a comparison between an estimated inside temperature and a real inside temperature in accordance with embodiments of the present disclosure. In FIG. 7A, a curve 710A indicates the inside temperature of the gas near the inside surface that is calculated according to the embodiments of the present disclosure, and a curve 720A indicates the real inside temperature of the gas near the inside surface that is monitored at the inside position 516 in the test. It is seen that amplitudes for the curves 710A and 720A are close to each other, and then it proves that the proposed method 300 greatly improves the accuracy for determining the inside temperature.

Figure 7B:
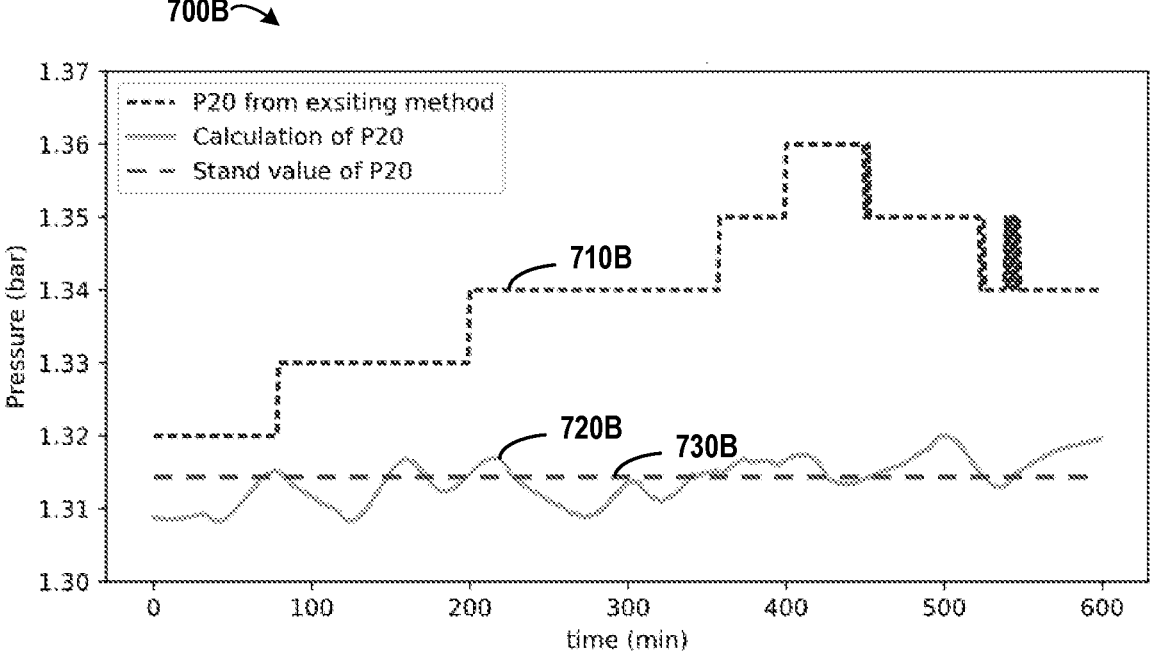
FIG. 7B illustrates a schematic diagram for an estimated gas pressure in accordance with embodiments of the present disclosure.

FIG. 7B illustrates a schematic diagram 700B for an estimated gas pressure in accordance with embodiments of the present disclosure, where the horizontal axis represents the time, and the vertical axis represents the gas pressure. In FIG. 7B, a curve 710B indicates the $P_{20}$ gas pressure from existing method, a curve 720 indicates the $P_{20}$ gas pressure that is calculated according to the method 300, and a line 730B indicates the value of $P_{20}$ gas pressure when the gas tank is in a normal state. Although the curve 720B includes some waves near the line 730B, the curve 720B is much closer to the normal line 730B when compared with the curve 710B. Therefore, the method 300 provides an accurate estimation of the gas pressure inside the gas tank.

Figure 8A:
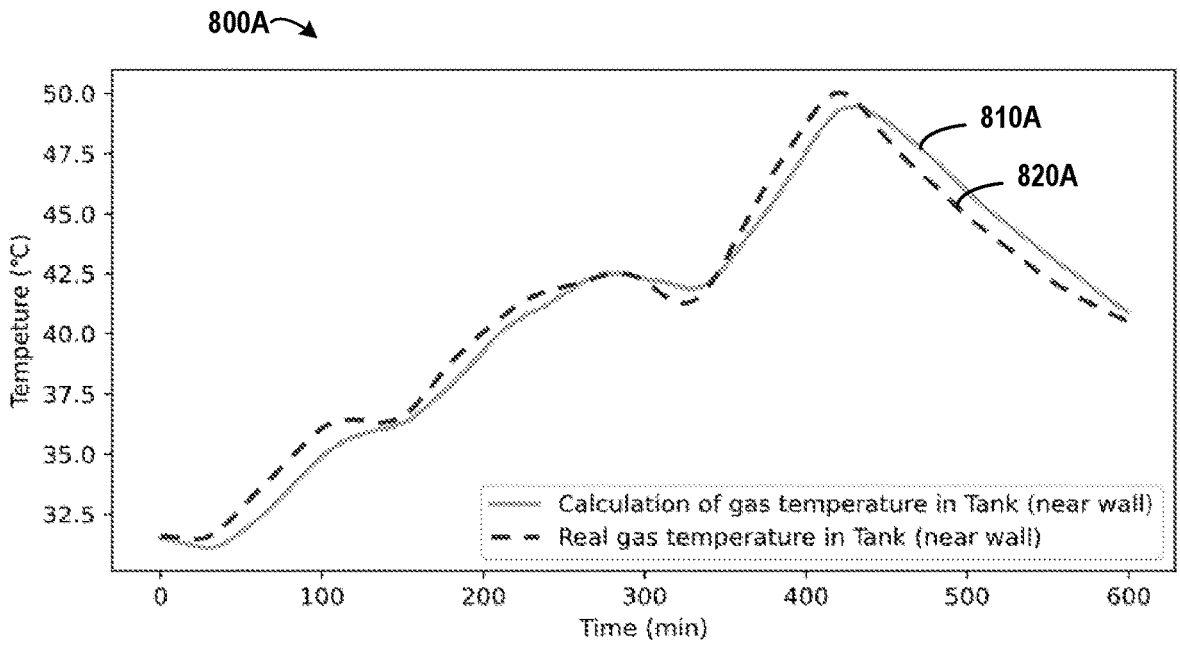
FIG. 8A illustrates a schematic diagram for a comparison between an estimated inside temperature and a real inside temperature in accordance with embodiments of the present disclosure.
Figure 8B:
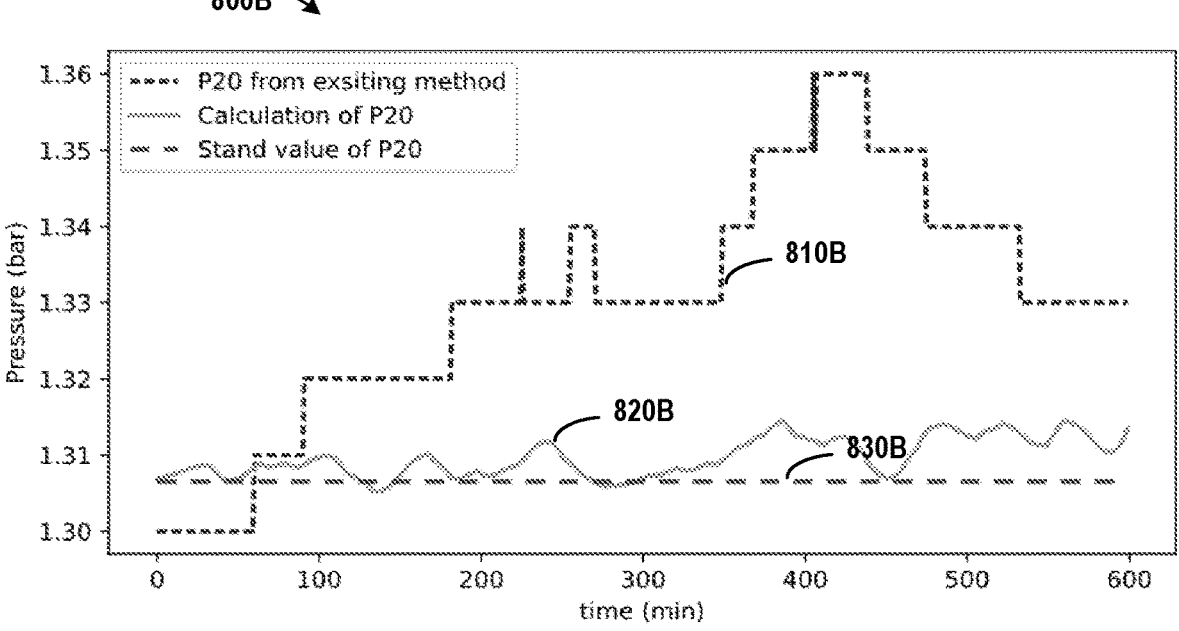
FIG. 8B illustrates a schematic diagram for an estimated gas pressure in accordance with embodiments of the present disclosure.

The preceding paragraphs have described details about the circuit breaker gas tank. Hereinafter, reference will be made to FIGS. 8A and 8B for more information about the busbar gas tank. Here, a top surface may be selected for the test, and temperature sensors may be placed near and at the top outside surface for collecting the outside temperatures. FIG. 8A illustrates a schematic diagram 800A for a comparison between an estimated inside temperature and a real inside temperature in accordance with embodiments of the present disclosure. In FIG. 8A, a curve 810A indicates the inside temperature of the gas near the inside surface that is calculated according to the embodiments of the present disclosure, and a curve 820A indicates the real inside temperature of the gas near the inside surface. FIG. 8B illustrates a schematic diagram for an estimated gas pressure in accordance with embodiments of the present disclosure. In FIG. 8B, a curve 810B indicates the $P_{20}$ gas pressure from existing method, a curve 820 indicates the $P_{20}$ gas pressure that is calculated according to the method 300, and a line 830B indicates the value of $P_{20}$ gas pressure when the busbar gas tank is in a normal state. As illustrated in FIGS. 8A and 8B, the method 300 provides an accurate estimation of the gas pressure inside the gas tank.

Figure 9:
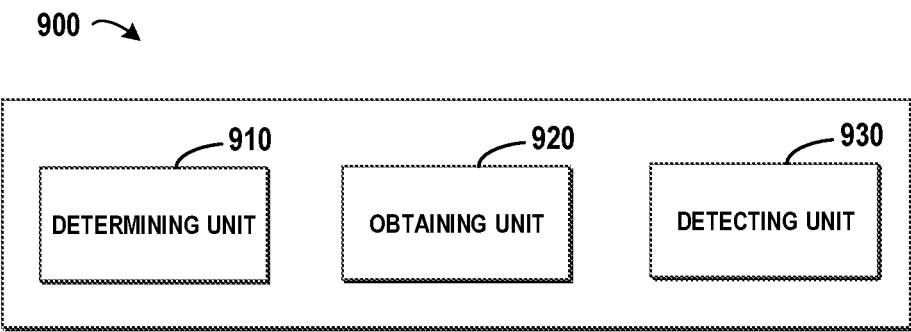
FIG. 9 illustrates a schematic diagram of an apparatus for detecting a gas leak of a gas tank in accordance with embodiments of the present disclosure.

The preceding paragraphs have provided detailed steps of the method 300, in other embodiments of the present disclosure, the method 300 may be implemented by an apparatus. FIG. 9 illustrates a schematic diagram of an apparatus 900 for detecting a gas leak of a gas tank of a Gas Insulated Electrical Device in accordance with embodiments of the present disclosure. In FIG. 9, the apparatus 900 comprises: a determining unit 910, configured for determining at least one inside temperature for the gas tank based on a plurality of outside temperatures that are collected outside the gas tank, the at least one inside temperature being estimated for at least one inside position within the gas tank during an operation of the Gas Insulated Electrical Device; an obtaining unit 920, configured for obtaining a gas pressure within the gas tank under a standard temperature based on the at least one inside temperature; and a detecting unit 930, configured for detecting the gas leak of the gas tank based on the gas pressure.

In some embodiments of the present disclosure, the plurality of outside temperatures comprise a first outside temperature and a second outside temperature, the first outside temperature being collected at a first outside position near an outside surface of the gas tank, and the second outside temperature being collected at a second outside position on the outside surface.

In some embodiments of the present disclosure, the at least one inside temperature includes a first inside temperature, which indicates a temperature for a first inside position on an inside surface of the gas tank, and the determining unit 910 is further configured for: determining an outside heat flux between the first outside position and the second outside position based on the first and second outside temperatures; determining a surface heat flux, that is associated with the first inside temperature, between the second outside position and the first inside outside position; and calculating the first inside temperature based on the outside heat flux and the surface heat flux.

In some embodiments of the present disclosure, the outside heat flux is determined by $\emptyset_{outside}=F(A, h_1, t_{f1}, t_{w1})$, the surface heat flux is determined by $\emptyset_{surface}=G(A, \lambda, \delta, t_{w2}, t_{w1})$, and the first inside temperature is calculated by $t_{w2}=H(h_1, t_{f1}, t_{w1}, \lambda, \delta)$, wherein A represents an area of a wall of the gas tank, $t_{f1}$ represents the first outside temperature, $t_{w1}$ represents the second outside temperature, $t_{w2}$ represents the first inside temperature, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, and F, G and H represent respective mathematical functions.

In some embodiments of the present disclosure, the at least one inside temperature further includes a second inside temperature, which indicates a temperature for a second inside position near the inside surface, and the determining unit 910 is further configured for: determining an inside heat flux between the first inside position and the second inside position; and calculating the second inside temperature based on the surface heat flux and the inside heat flux.

In some embodiments of the present disclosure, the inside heat flux is determining by $\varnothing_{inside}=I(A, h_2, t_{w2}, t_{f2})$, and the second inside temperature is calculated by $t_{f2}=S(h_1, h_2, \lambda, \delta, t_{f1}, t_{w1})$, wherein $t_{f2}$ represents the second inside temperature, $t_{f1}$ represents the first outside temperature, $t_{w1}$ represents the second outside temperature, $t_{w2}$ represents the first inside temperature, A represents an area of a wall of the gas tank, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, $h_2$ represents a coefficient of heat transfer related to $t_{w2}$ and $t_{f2}$, and I and S represent respective mathematical functions.

In some embodiments of the present disclosure, the detecting unit 930 is further configured for detecting the gas leak in response to any of: a determination that the gas pressure is below a threshold pressure; and a determination that a change associated with the gas pressure is above a threshold change.

In some embodiments of the present disclosure, the first and second positions are selected based on a planar surface of the gas tank that is larger than another outside surface of the gas tank.

In some embodiments of the present disclosure, the apparatus 900 further comprises: an updating unit, configured for updating the inside temperature based on a current strength of Gas Insulated Electrical Device, the current strength being received from a controller of the Gas Insulated Electrical Device.

Figure 10:
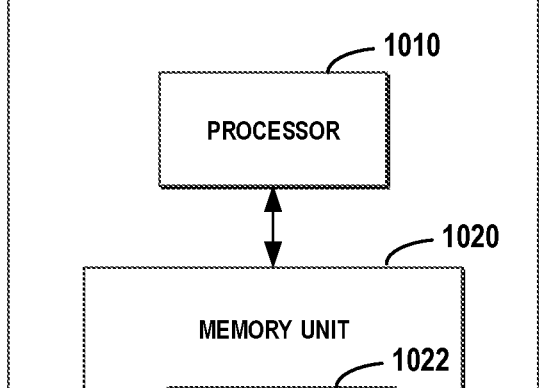
FIG. 10 illustrates a schematic diagram of a system for detecting a gas leak of a gas tank in accordance with embodiments of the present disclosure.

In some embodiments of the present disclosure, a system 1000 is provided for detecting a gas leak of a gas tank. FIG. 10 illustrates a schematic diagram of a system 1000 for detecting a gas leak of a gas tank in accordance with embodiments of the present disclosure. As illustrated in FIG. 10, the system 1000 may comprise a computer processor 1010 coupled to a computer-readable memory unit 1020, and the memory unit 1020 comprises instructions 1022. When executed by the computer processor 1010, the instructions 1022 may implement the method 300 for tuning a robot system as described in the preceding paragraphs, and details will be omitted hereinafter.

In some embodiments of the present disclosure, a computer readable medium for detecting a gas leak of a gas tank is provided. The computer readable medium has instructions stored thereon, and the instructions, when executed on at least one processor, may cause at least one processor to perform the method for detecting a gas leak of a gas tank as described in the preceding paragraphs, and details will be omitted hereinafter.

In some embodiments of the present disclosure, a computer program product is provided for detecting a gas leak of a gas tank. The computer readable medium has instructions stored thereon, and the instructions, when executed on at least one processor, may cause at least one processor to perform the method for detecting a gas leak of a gas tank as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting a gas leak of a gas tank of a Gas Insulated Electrical Device, comprising:

estimating at least one inside temperature for the gas tank based on a plurality of outside temperatures that are collected outside of the gas tank, the at least one inside temperature being estimated for at least one inside position within the gas tank during an operation of the Gas Insulated Electrical Device;

obtaining a gas pressure within the gas tank under a standard temperature based on the at least one inside temperature; and detecting the gas leak of the gas tank based on the gas pressure, wherein the plurality of outside temperatures comprise a first outside temperature and a second outside temperature, the first outside temperature being collected at a first outside position near an outside surface of the gas tank, and the second outside temperature being collected at a second outside position on the outside surface, wherein the at least one inside temperature includes a first inside temperature, which indicates a temperature for a first inside position on an inside surface of the gas tank, and the first inside temperature is estimated by:

determining an outside heat flux between the first outside position and the second outside position based on the first and second outside temperatures;

determining a surface heat flux, that is associated with the first inside temperature, between the second outside position and the first inside outside position; and calculating the first inside temperature based on the outside heat flux and the surface heat flux.

2. The method of claim 1, wherein:

the outside heat flux is determined by $\emptyset_{outside}=F(A, h_1, t_{f1}, t_{w1})$, the surface heat flux is determined by $\emptyset_{surface}=G(A, \lambda, \delta, t_{w2}, t_{w1})$, and the first inside temperature is calculated by $t_{w2}=H(h_1, t_{f1}, t_{w1}, \lambda, \delta)$, wherein A represents an area of a wall of the gas tank, $t_{f1}$ represents the first outside temperature, $t_{w1}$ represents the second outside temperature, $t_{w2}$ represents the first inside temperature, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, and F, G and H represent respective mathematical functions.

3. The method of claim 1, wherein the at least one inside temperature further includes a second inside temperature, which indicates a temperature for a second inside position near the inside surface, and the second inside temperature is determined by:

determining an inside heat flux between the first inside position and the second inside position; and calculating the second inside temperature based on the surface heat flux and the inside heat flux.

4. The method of claim 3, wherein:

the inside heat flux is determining by $\emptyset_{inside}=I(A, h_2, t_{w2}, t_{f2})$, and the second inside temperature is calculated by $t_{f2}=S(h_1, h_2, \lambda, \delta, t_{f1}, t_{w1})$, wherein $t_{f2}$ represents the second inside temperature, $t_{f1}$ represents the first outside temperature, $t_{w1}$ represents the second outside temperature, $t_{w2}$ represents the first inside temperature, A represents an area of a wall of the gas tank, $h_1$ represents a coefficient of heat transfer related to $t_{f1}$ and $t_{w1}$, $\lambda$ represents a coefficient of heat transfer related to $t_{w1}$ and $t_{w2}$, $\delta$ represents a thickness of the wall, $h_2$ represents a coefficient of heat transfer related to $t_{w2}$ and $t_{f2}$, and I and S represent respective mathematical functions.

5. The method of claim 1, wherein detecting the gas leak comprises detecting the gas leak in response to any of:

a determination that the gas pressure is below a threshold pressure; and a determination that a change associated with the gas pressure is above a threshold change.

6. The method of claim 1, wherein the first and second positions are selected based on a planar surface of the gas tank that is larger than another outside surface of the gas tank.

7. The method of claim 1, further comprises: updating the inside temperature based on a current strength of Gas Insulated Electrical Device, the current strength being received from a controller of the Gas Insulated Electrical Device.

8. An apparatus for detecting a gas leak of a gas tank of a Gas Insulated Electrical Device, comprising:

a determining unit, being configured for determining at least one inside temperature for the gas tank based on a plurality of outside temperatures that are collected outside of the gas tank, the at least one inside temperature being estimated for at least one inside position within the gas tank during an operation of the Gas Insulated Electrical Device;

an obtaining unit, being configured for obtaining a gas pressure within the gas tank under a standard temperature based on the at least one inside temperature; and a detecting unit, being configured for detecting the gas leak of the gas tank based on the gas pressure, wherein the plurality of outside temperatures comprise a first outside temperature and a second outside temperature, the first outside temperature being collected at a first outside position near an outside surface of the gas tank, and the second outside temperature being collected at a second outside position on the outside surface, wherein the at least one inside temperature includes a first inside temperature, which indicates a temperature for a first inside position on an inside surface of the gas tank, and the determining unit is further configured for:

determining an outside heat flux between the first outside position and the second outside position based on the first and second outside temperatures;

determining a surface heat flux, that is associated with the first inside temperature, between the second outside position and the first inside outside position; and calculating the first inside temperature based on the outside heat flux and the surface heat flux.

9. The apparatus of claim 8, wherein the at least one inside temperature further includes a second inside temperature, which indicates a temperature for a second inside position near the inside surface, and the determining unit is further configured for:

determining an inside heat flux between the first inside position and the second inside position; and calculating the second inside temperature based on the surface heat flux and the inside heat flux.

10. A system for detecting a gas leak of a gas tank, comprising: a computer processor coupled to a computer-readable memory unit, the memory unit comprising instructions that when executed by the computer processor implements the method according to claim 1.

11. A computer readable medium having instructions stored thereon, the instructions, when executed on at least one processor, cause the at least one processor to perform the method according to claim 1.

12. A computer product having instructions stored thereon, the instructions, when executed on at least one processor, cause the at least one processor to perform the method according to claim 1.

13. The system of claim 10, wherein the plurality of outside temperatures comprise a first outside temperature and a second outside temperature, the first outside temperature being collected at a first outside position near an outside surface of the gas tank, and the second outside temperature being collected at a second outside position on the outside surface.

14. The computer readable medium of claim 11, wherein the plurality of outside temperatures comprise a first outside temperature and a second outside temperature, the first outside temperature being collected at a first outside position near an outside surface of the gas tank, and the second outside temperature being collected at a second outside position on the outside surface.

15. The computer product of claim 12, wherein the plurality of outside temperatures comprise a first outside temperature and a second outside temperature, the first outside temperature being collected at a first outside position near an outside surface of the gas tank, and the second outside temperature being collected at a second outside position on the outside surface.

* * * * *